United States Patent [19]
Watt et al.

[11] Patent Number: 4,808,458
[45] Date of Patent: Feb. 28, 1989

[54] TEXTURED SUEDE

[75] Inventors: Keith A. Watt, Toledo; William E. Bachman, Sylvania, both of Ohio

[73] Assignee: Gencorp Inc., Akron, Ohio

[21] Appl. No.: 153,687

[22] Filed: Feb. 8, 1988

[51] Int. Cl.[4] .............................................. B32B 33/00
[52] U.S. Cl. ...................................... 428/90; 427/200; 427/206; 427/368; 428/95; 428/96; 428/97
[58] Field of Search ....................... 428/85, 90, 95, 96, 428/97; 427/200, 206, 368

[56] References Cited

U.S. PATENT DOCUMENTS

| | | | |
|---|---|---|---|
| 4,046,504 | 9/1977 | Fukushima | 8/17 |
| 4,282,051 | 8/1981 | Terpay | 428/96 |
| 4,448,831 | 5/1984 | Civardi | 428/91 |
| 4,721,642 | 1/1988 | Yoshimi et al. | 428/96 |

FOREIGN PATENT DOCUMENTS 2836997 6/1980 Fed. Rep. of Germany .

Primary Examiner—Marion C. McCamish

[57] ABSTRACT

A textured suede fabric lamina is produced by applying a thermoplastic compound to a flocked fabric. Desirably, the thermoplastic compound is expandable, that is having a blowing agent therein, so that upon heating an expanded infused layer is formed which can be sueded. The infused layer provides an improved appearance as well as improved physical properties such as feel, cleanability, color stability, and flock adhesion. A thin soil-resistant compound such as a halogenated polymer can be applied thereto. The textured suede lamina can be readily embossed.

20 Claims, 1 Drawing Sheet

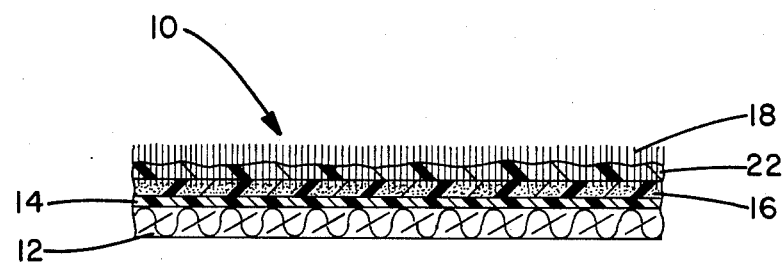

TEXTURED SUEDE

FIELD OF THE INVENTION

A flocked fabric is infused with a thermoplastic compound, which optionally can be a foam, and abraded to yield a textured suede having improved physical properties and appearance. The suede flocked fabric can be readily embossed.

BACKGROUND ART

Heretofore, flocked fabrics have been made by coating a synthetic and/or natural fabric with a thermoplastic material, for example a vinyl polymer. A conventional flock adhesive was applied to the coated fabric and flocked, that is short fibers of generally equal length are electrostatically deposited on the adhesive.

U.S. Pat. No. 4,046,504 to Fukushima relates to a process for preparing a colored suede sheet wherein a fibrous mat is impregnated with a binder and subsequently treated to produce a sheet material having a napped surface. Hence, a napped material is produced which is subsequently dyed. A flocked fabric is not utilized nor is the material abraded to obtain a suede finish.

U.S. Pat. No. 4,448,831 to Civardi also relates to a napped fabric. The fibers on one face of the napped fabric are bonded together by impregnating the same with a polymer bonding agent in an amount such that the napped structure is still largely open and porous. The impregnated napped fibers are subsequently brushed to a bent-over position to yield a desirable fleshed leather appearance such as a split suede. A flocked fabric is thus not utilized.

Offenlegungsschrift No. 28 36 997 relates to an artificial suede leather made from a resin solution impregnating a fabric having a pile of very fine polyester and cotton filaments. A napped fabric exists which is subsequently sheared.

SUMMARY OF THE INVENTION

It is thus an aspect of the present invention to provide a flocked fabric which is treated with a thermoplastic material and abraded to yield a textured suede. The treated suede has improved physical and chemical properties.

The textured suede fabric is actually a lamina having a fabric layer as a substrate. A substrate coating layer exists on the fabric with the coating being generally any type of polymer such as thermoplastic and often time a vinyl coating. Flock is then electrostatically applied to an adhesive located on the coating layer. According to concepts of the present invention, a thermoplastic compound such as a urethane or a vinyl plastisol, optionally containing blowing agents therein, is applied to or infused into the flocked fabric. A small amount of free flocked fabric ends desirably exists after the infusing step. Subsequently, the infused flocked fabric is abraded as by a rotating sanding drum to yield a textured suede which can be readily embossed. An optional soil resistant compound such as a halogenated type polymer can be applied to the textured suede fabric.

BRIEF DESCRIPTION OF THE DRAWINGS

The invention will be better understood by reference to the following drawings in which:

The FIGURE is side elevation, cross-sectional view showing a treated flocked fabric according to the present invention.

DETAILED DESCRIPTION OF THE INVENTION

The present invention relates to infusing a flocked fabric generally indicated by the numeral 10 (The FIGURE) with a thermoplastic compound so that a textured suede lamina can be made. Flocked fabrics are known to the art and to the literature and hence will only be briefly discussed. Such fabrics generally contain a fabric layer substrate 12 which is a woven fabric, nonwoven, or a knit. Generally any type of fabric weave or knit as well as weight, e.g., ounces per square yard, can be utilized. Fabric layer 12 can be made of natural material, synthetic material, or both. Examples of natural materials include cotton, wool, silk, and the like, and examples of synthetic materials include polyester, nylon, acrylic, acrylonitrile, polypropylene, polyethylene, rayon, and the like. An exemplary common and sometimes preferred substrate is a polyester/cotton weave, nonwoven, or knit.

The fabric layer or substrate 12 typically has a substrate coating layer 14 which is often a thermoplastic polymer. Conventional type coatings include various vinyl or acrylic latexes in which the polymer is emulsified in water, extruded polyvinyl chloride, and various vinyl plastisols in which the vinyl resin is generally dispersed in a plasticizer or calendered with compounded polyvinyl chloride. Vinyl resins which are calendered with compounded polyvinyl chloride are preferred. Other coatings can also be utilized such as urethane, chlorinated polyethylene, polyolefin, and the like. The substrate coating layer can be applied in any manner as by spraying, coating, casting, extruding, calendering, and the like, and also can be in the form of a foam. The amount of the substrate coating material can vary over a wide range but generally is from about 4 ounces to about 20 ounces per square yard.

The flock is usually applied to the coated fabric utilizing a conventional adhesive, generally referred to as a flock adhesive. Numerous different types of flocked fibers 18 can be utilized with examples including conventional fibers such as nylon, acrylic, polyester, polypropylene, and the like, with nylon being preferred. Fibers 18 are often pigmented or dyed. The length of the fibers can vary greatly as from about 0.02 to about 0.15 inches and the denier thereof is generally from about 1.0 to about 6.0. The length of the fibers and denier thereof can be random but usually is relatively uniform.

Flocked fibers 18 are applied to the coated fabric layer in a conventional manner utilizing a conventional flock adhesive 16. Typically, the fibers are electrostatically charged and applied to the adhesive so that they are generally parallel to each other and aligned in the same direction, i.e., generally perpendicular to the fabric substrate. The flock adhesive can be any conventional adhesive such as a vinyl acetate copolymer plastisol, the preferred adhesive, or an acrylic latex, a urethane, a polyvinyl chloride plastisol, and the like. The thickness of the flock adhesive is very small and generally is from about 1 mil to about 15 mils and more desirably from about 2 mils to about 10 mils.

The above flocked fabric has been briefly described inasmuch as such is generally known to the art. Thus, various aspects thereof such as the specific type of fabric weave or knit, the weight per square unit of area, the types of the synthetic fabric or natural fabrics, the type of polymeric substrate coating materials or layers, the various types of flock adhesives, the various specific types of flock fibers, and the like, are well known to the art and to the literature and hence resort can be made thereto.

According to the present invention, a thermoplastic infusing compound 22 is utilized and generally coats an upstanding portion of the flock fibers 18. In other words, thermoplastic infusing layer 22, i.e., a saturant, is generally applied such that is it contiguous with flock adhesive layer 16. That is, it impregnates the flocking and resides on the bottom portion thereof. Although the thermoplastic and fusing layer 22 generally is juxtapositioned and contiguous to flock adhesive layer 16, the application thereof will usually coat the ends of the flocked fabric. It is desirable that a small amount of thermoplastic free flock fiber ends exists. Infusing layer 22 can generally be a continuous layer although, if desired, it can be a discontinuous layer such that a desired shape, pattern, etc. is formed. The thermoplastic infusing layer 22 is generally a thermoplastic compound which, when added in an effective amount, imparts desirable physical and chemical properties such as feel, cleanability, color stability, protection against mildew and ultraviolet degradation, flock adhesion, abrasion resistance, as well as a suede like appearance after abrading. Another desirable property is that the thermoplastic compound be flexible and have a flexibility of approximately or similar to the flexibility of fabric substrate 12. Such thermoplastics are generally a fusible or curable viscous liquid polymer and include various thermoplastics such as vinyl (i.e., polyvinyl chloride) latex, an acrylic latex, a urethane latex, a vinyl homopolymer plastisol, a vinyl copolymer plastisol, and the like. A foamable vinyl homopolymer plastisol or a foamable vinyl copolymer plastisol is generally preferred. That is, the various thermoplastic infusing compounds 22 can contain a blowing agent or the like so that upon heating thereof, a foam is formed. Foam infusing layers generally have a density of from about 20 to about 30 pounds per cubic foot. Another important property of the infusing layer is that it imparts qualities necessary to make the lamina abradable without being torn apart or shredded by the abrading process.

The amount of the thermoplastic infusing compound utilized, as noted above, is an effective mount to yield the above-noted improved properties. For example, a preferred improved property is suede-like appearance and feel. Excessive amounts tend to result in the flocked material becoming matted together and destroying any textured suede result. In other words, it is an important aspect of the present invention that a mat not be formed but that actual free ends of flock exist so that a suede type material or lamina is produced. On the other hand, too little of the thermoplastic infusing compound does not generally result in production of desired properties. An effective amount will naturally vary upon the type of flock, the length of the flocked fibers, and the like, but typically is in the range of from about 1 ounce to about 20 ounces per square yard, desirably from about 2 to about 12 ounces per square yard, and preferably from about 6 to about 9 ounces per square yard when fused.

Although foamed thermoplastic infusing compounds are optional, they are nevertheless preferred. Generally any physical or chemical blowing agent can be utilized with the latter being desired. Various groups or classes of chemical blowing agents include the various hydrazide compounds such as p,p'oxybis(benzenesulfonyl hydrazide), the various toluenesulfonyl compounds, and the various azo blowing agents which are preferred. An example of an azo blowing agent is axodicarbonamide (1,1'azobisformamide). Other examples of blowing agents include phenyltetrazole, trihydrazine, triazine, and the like. The above chemical blowing agents are generally heat activated such that upon reaching a predetermined temperature, a gas is generally emitted therefrom such as carbon dioxde which results in a foamed thermoplastic being formed. Naturally, the foaming temperature will vary depending upon the particular type of blowing agent utilized. For example, azodicarbonamide generally has a blowing temperature of approximately 350° F. The amount of blowing agent can generally vary depending upon the density or type of foam structure desired, but typically is from about ½ to about 10 parts by weight and preferably from about 1 part to about 5 parts by weight for every 100 parts by weight of the thermoplastic infusing compound which also includes the blowing agent.

The thermoplastic infused flocked fabric is then sueded as by abrading. The actual brading process can utilize any braiding apparatus such as a rotating drum sander having a suitable sandpaper grit thereon which abrades the thermoplastic infused flock. The abrading process usually removes all of the exterior surface thermoplastic infusing compound or foam. A portion of the exterior flocked fibers are thus restored. That is, the thermoplastic infusing compound is generally removed from the ends thereof. The depth of the abrading process generally extends from about 25 to about 75 percent from the fiber ends to the surface of the adhesive, i.e., adhesive-free fiber length, and desirably is from about 40 to about 60 percent of the length with from about 45 to about 50 percent of the adhesive-free fiber length being preferred. Hence, the amount of free flocked fiber is approximately the same. That is, the amount or depth of the thermoplastic infusing layer is generally from about 25 percent to about 75 percent, desirably from about 40 percent to about 60 percent, and preferably from about 45 percent to about 50 percent of the total length of the fibers before the application of the infusing compound. Generally, the amount of thermoplastic infusing compound removed is from about 1 ounce to about 12 ounces per square yard and more preferably from about 2 to about 3 ounces per square yard. The sueding or abrading process continues until desirable look, feel, and aesthetic properties are achieved along with the improved properties hereinabove noted.

An optional aspect of the present invention is the embossing of the abraded or textured suede fabric. Embossing can be carried out in any conventional manner utilizing pressure and heat to produce grooves or depressions within the finished sueded leather fabric. The heat and pressure can generally vary over a wide range, with the heat being at least 250° F. and desirably at least 300° F. It is noted that according to the present invention, embossing can be readily accomplished. This is in distinct contrast to conventional flocked fabrics which generally cannot be embossed.

Another optional aspect of the present invention is to apply a soil-resistant coating to the textured suede produced by the present invention. That is, various solid resistant polymers such as halogen containing polymers can be applied as by spraying or roller coating the abraded thermoplastic infused flocked fabrics of the present invention. Examples of halogenated polymers include polytetrafluoroethylene, fluoro and/or chlorinated polyethylene, vinylidene chloride, perfluoroalkylmethacrylate, and the like. In addition to fluoro or cloro polymers, various other organic compounds can be utilized such a various vinyl lacquers, acrylic lacquers, vinyl latexes, acrylic latexes, urethane latexes, urethane lacquers, and the like. The wet weight amount of the abrasive-resistant coating is generally from about 4 ounces to about 12 ounces per square yard and desirably from about 6 to about 10 ounces per square yard. The dry weight amount of the abrasive-resistant coating is generally from about 0.3 to about 1 ounce per square yard and desirably from about 0.5 to about 0.7 ounces per square yard.

Inasmuch as the textured suede fabric of the present invention has good feel, good aesthetic appearance, good abrasion resistance, good color stability and protection against mildew and ultraviolet degradation, it can be used in situations wherever such is desired. Suitable uses include vehicle applications, for example automotive door insert panels, seat covers, instrument panel trim, and the like.

The invention will be better understood by reference to the following examples.

EXAMPLES

The fabric substrates was a 3.2 oz./yd.$^2$ polyester/cotton knit. The substrate was coated with polyvinyl chloride in an amount of 8 oz./yd.$^2$ (i.e., about an 8 mil layer). A flock adhesive was applied to the coated fabric. The adhesive was a vinyl acetate copolymer plastisol applied by a knife coated to a depth of 5 mils. The flock was 100 percent nylon fiber having a denier from about 1.5 to about 3.0 and a random cut of from about 0.030 inches to about 0.090 inches.

The thermoplastic infusing compound was a vinyl copolymer plastisol which was applied at a rate of about 8 ounces per square yard. The plastisol contained about 3.4 parts by weight of azodicarbonamide per 100 parts by weight of the vinyl copolymer plastisol.

The exact formulation of the thermoplastic infusing compound was as follows:

Polyvinyl chloride-vinyl acetate (96.2/4.8%) copolymer: =50.7 parts by weight
Butyl benzyl phthalate: =33.0 parts by weight
Zinc oxide: =3.4 parts by weight
Azodicarbonamide: =3.4 parts by weight
Phthalate Plasticizer: =3.4 parts by weight
Pigment: =6.1 parts by weight The infusing compound was applied with an engraved roller and then heated to a temperature of approximately 370° F. whereupon a foamed infusing layer was generated which fused upon continued heating. The amount of the infusing compound was approximately 7.5 ounces per square yard. The flocked fabric had a velvet finish and appearance.

While in accordance with the Patent Statutes, the best mode and preferred embodiment have been set forth, the scope of the invention is not limited thereto, but rather by the scope of the attached claims.

What is claimed is:

1. A suede fabric lamina, comprising:
a synthetic or natural fabric coated with a polymer having a flock adhesive applied thereto, flock fibers electrostatically deposited on said flock adhesive, and
an effective amount of a thermoplastic infusing compound contiguous with said flock adhesive and impregnating said flock fibers and residing at the bottom portion of said flock fibers, said thermoplastic infusing compound having been abraded so that said flocked fabric has a suede-like finish.

2. A suede fabric lamina according to claim 1, wherein said thermoplastic infusing compound is a flexible polymer, and wherein said effective amount of said thermoplastic infusing compound is from about 1 ounce to about 20 ounces per square yard of flocked fabric.

3. A suede fabric lamina according to claim 2, wherein said weight of said thermoplastic infusing compound is from about 2 ounces to about 12 ounces per square yard of flocked fabric, and wherein said thermoplastic infusing compound is a polyvinyl chloride latex, an acrylic latex, a urethane latex, a polyvinyl chloride homopolymer plastisol, a polyvinyl chloride copolymer plastisol, and combinations thereof.

4. A suede fabric lamina according to claim 3, wherein said weight of said thermoplastic infusing compound is from about 6 to 9 ounces per square yard of flocked fabric.

5. A suede fabric lamina according to claim 4, wherein the depth of said thermoplastic infusing compound is from about 25 percent to about 75 percent of said flock fibers.

6. A suede fabric lamina according to claim 5, wherein said thermoplastic infusing compound is abradable and is a polyvinyl chloride homopolymer plastisol or a polyvinyl chloride copolymer plastisol.

7. A suede fabric lamina according to claim 6, wherein the depth of said thermoplastic infusing compound is from about 40 percent to about 60 percent of said flock fibers.

8. A suede fabric lamina according to claim 7, wherein said suede fabric lamina is an embossed suede fabric lamina.

9. A suede fabric lamina according to claim 6, wherein said thermoplastic compound is in the form of a foam, wherein said thermoplastic compound contains from about ½ to about 5 parts by weight per 100 parts by weight of said thermoplastic infusing compound of an azo type blowing agent, and wherein said fabric is a blend of polyester and cotton.

10. A suede fabric lamina according to claim 6, wherein said suede fabric lamina is an embossed suede fabric lamina.

11. A suede fabric lamina according to claim 3, wherein said thermoplastic compound is in the form of a foam, wherein said thermoplastic compound contains from about ½ to about 5 parts by weight per 100 parts by weight of said thermoplastic infusing compound of an azo type blowing agent, and wherein said fabric is a blend of polyester and cotton.

12. A suede fabric lamina according to claim 1, wherein said thermoplastic infusing compound is in the form of a foam.

13. A suede fabric lamina according to claim 1, wherein said suede fabric lamina is an embossed suede fabric lamina.

14. A suede fabric lamina, comprising
a first layer of a synthetic or a natural fabric,
a second layer of polymeric material adhered to said first layer,
a third layer of flock adhesive in which flock fibers have been deposited in a substantially vertical position, and a fourth layer of thermoplastic infusing compound surrounding said flock fibers so that free flock fiber ends exist.

15. A process for producing a suede flocked fabric, comprising the steps of:
    adding a thermoplastic infusing compound to a flocked fabric, said flocked fabric comprising flock fibers electrostatically deposited on a flock adhesive,
    said thermoplastic infusing compound impregnating said flock fibers and residing at the bottom portion thereof, and
    abrading said thermoplastic infused compound in said flock fibers to produce a suede flocked fabric.

16. A process according to claim 15, wherein said thermoplastic infusing compound is a polyvinyl, chloride latex, an acrylic latex, a urethane latex, a polyvinyl chloride homopolymer plastisol, a polyvinyl chlroide copolymer plastisol, and combinations thereof, 17. A process according to claim 16, wherein the amount of said thermoplastic compound is from about 2 ounces to about 12 ounces per square yard of flocked fabric.

18. A process according to claim 17, wherein the depth of said thermoplastic infusing compound is from about 25 percent to about 75 percent of the length of said flocked fabric.

19. A process according to claim 15, including forming a foamed thermoplastic infusing layer.

20. A process according to claim 17, including forming a foamed thermoplastic infusing layer.

* * * * *